United States Patent
Itoh et al.

(10) Patent No.: US 7,982,426 B2
(45) Date of Patent: Jul. 19, 2011

(54) ELECTRIC POWER SYSTEM

(75) Inventors: Junichi Itoh, Nagaoka (JP); Akio Toba, Tokyo (JP); Kouetsu Fujita, Tokyo (JP)

(73) Assignees: National University Corporation, Nagaoka University of Technology (JP); Fuji Electric Holdings Co., Ltd. (JP)

( * ) Notice: Subject to any disclaimer, the term of this patent is extended or adjusted under 35 U.S.C. 154(b) by 642 days.

(21) Appl. No.: 11/716,387

(22) Filed: Mar. 9, 2007

(65) Prior Publication Data

US 2007/0241719 A1   Oct. 18, 2007

(30) Foreign Application Priority Data

Mar. 9, 2006   (JP) ................................ 2006-064276
Nov. 27, 2006  (JP) ................................ 2006-318075

(51) Int. Cl.
    *H02P 27/04* (2006.01)
(52) U.S. Cl. ........ 318/801; 318/139; 318/442; 318/109; 318/108
(58) Field of Classification Search .................. 318/801, 318/139, 442, 109, 108
    See application file for complete search history.

(56) References Cited

U.S. PATENT DOCUMENTS

| | | | |
|---|---|---|---|
| 5,608,616 A * | 3/1997 | Umeda et al. | 363/132 |
| 5,804,973 A * | 9/1998 | Shinohara et al. | 324/548 |
| 6,066,928 A * | 5/2000 | Kinoshita et al. | 318/139 |
| 6,137,704 A | 10/2000 | Ito et al. | |
| 6,320,775 B1 | 11/2001 | Ito et al. | |
| 6,476,571 B1 | 11/2002 | Sasaki | |
| 6,548,984 B2 * | 4/2003 | Shamoto et al. | 318/801 |
| 6,806,671 B2 * | 10/2004 | Kusaka et al. | 318/442 |
| 6,930,460 B2 * | 8/2005 | Ishikawa et al. | 318/442 |
| 7,400,116 B2 * | 7/2008 | Kato et al. | 320/166 |
| 2003/0057908 A1 | 3/2003 | Kusaka et al. | |

FOREIGN PATENT DOCUMENTS

| | | |
|---|---|---|
| JP | 200032457 A | 1/2000 |
| JP | 2000-324857 A | 11/2000 |
| JP | 3223842 | 8/2001 |
| JP | 2003-102181 A | 4/2003 |
| JP | 2004-297851 A | 10/2004 |
| JP | 2005-341746 A | 12/2005 |

OTHER PUBLICATIONS

"Japanese Application Serial No. 2006-318075, Notice of Rejection Ground mailed May 24, 2011", (w/ English Translation), 7 pgs.

* cited by examiner

*Primary Examiner* — Walter Benson
*Assistant Examiner* — David S Luo
(74) *Attorney, Agent, or Firm* — Schwegman, Lundberg & Woessner, P.A.

(57) ABSTRACT

An electric power system comprises an AC motor, a first DC voltage unit, an inverter as a power converter, being connected between the AC motor and first DC voltage unit, for exchanging power between these two components; and a controlled DC power supply which is connected between an arbitrary spot of a coil of the AC motor and a positive or negative electrode of the first DC voltage unit and which connects at least one semiconductor switching element and a battery as a second DC voltage unit in series.

15 Claims, 21 Drawing Sheets

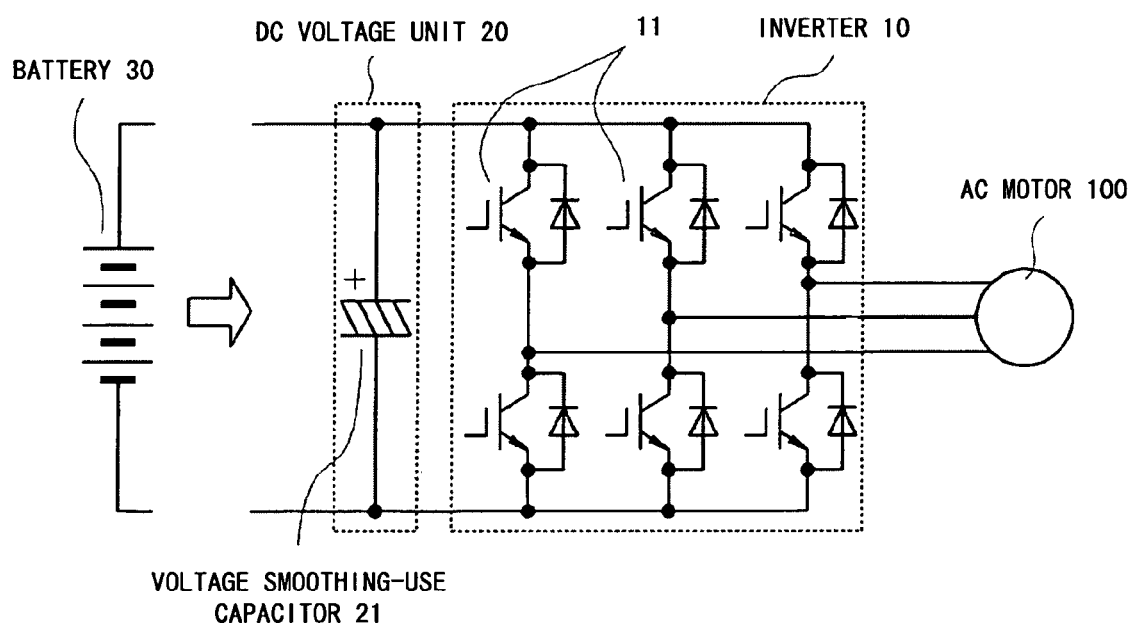
F I G. 1

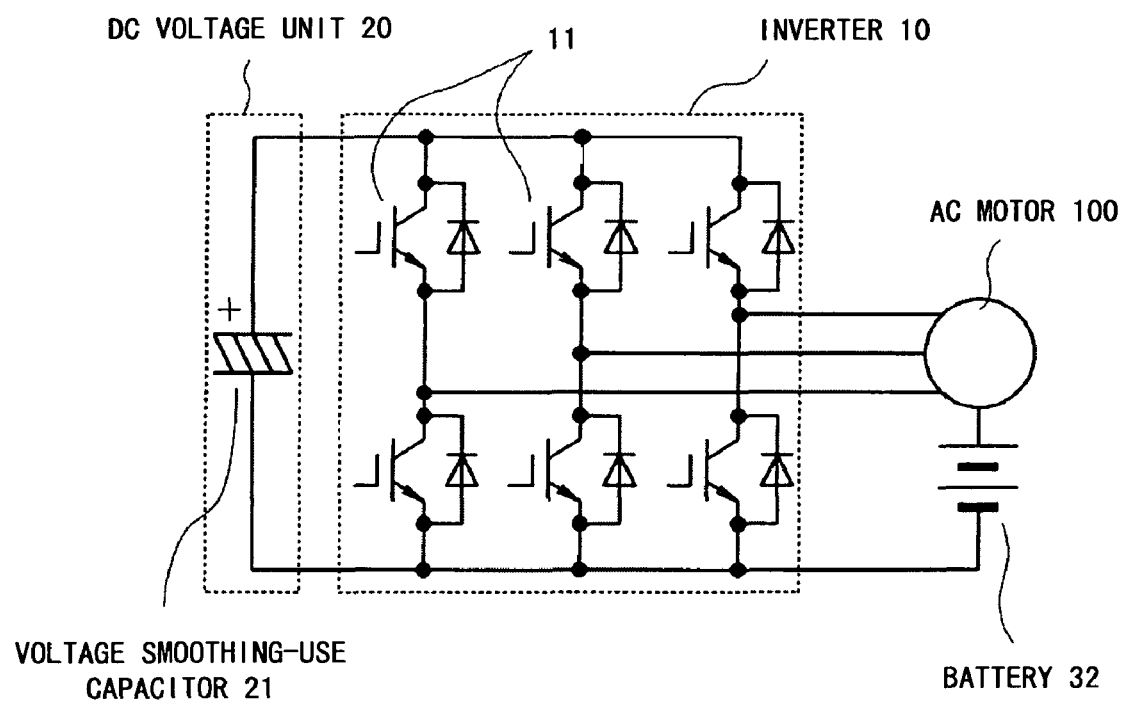
F I G. 3

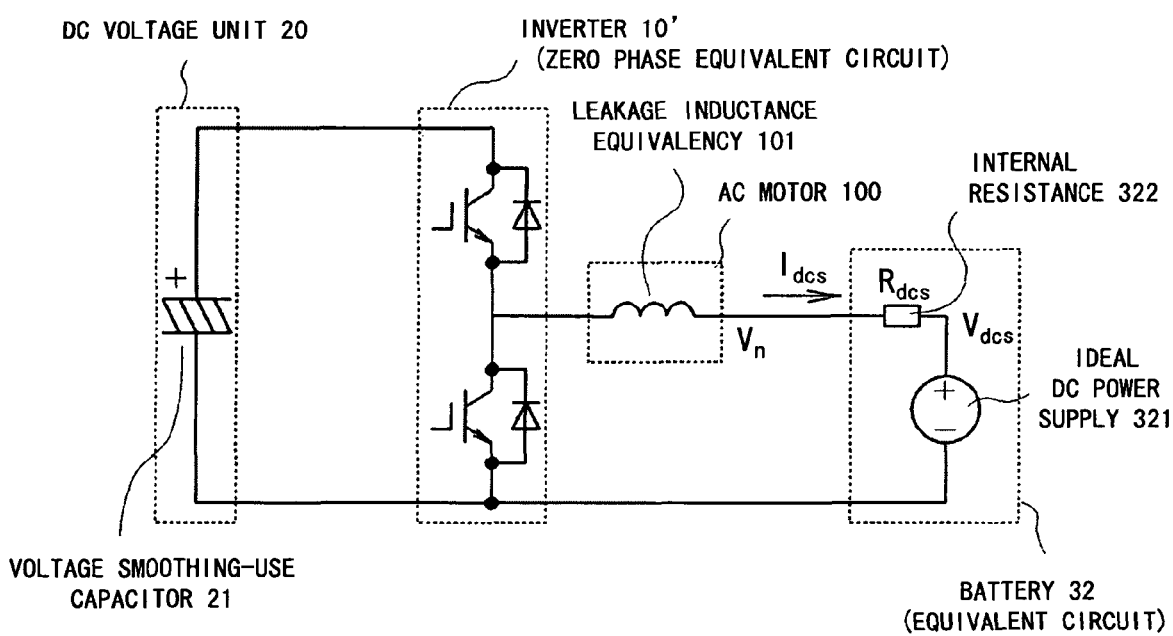
F I G. 4

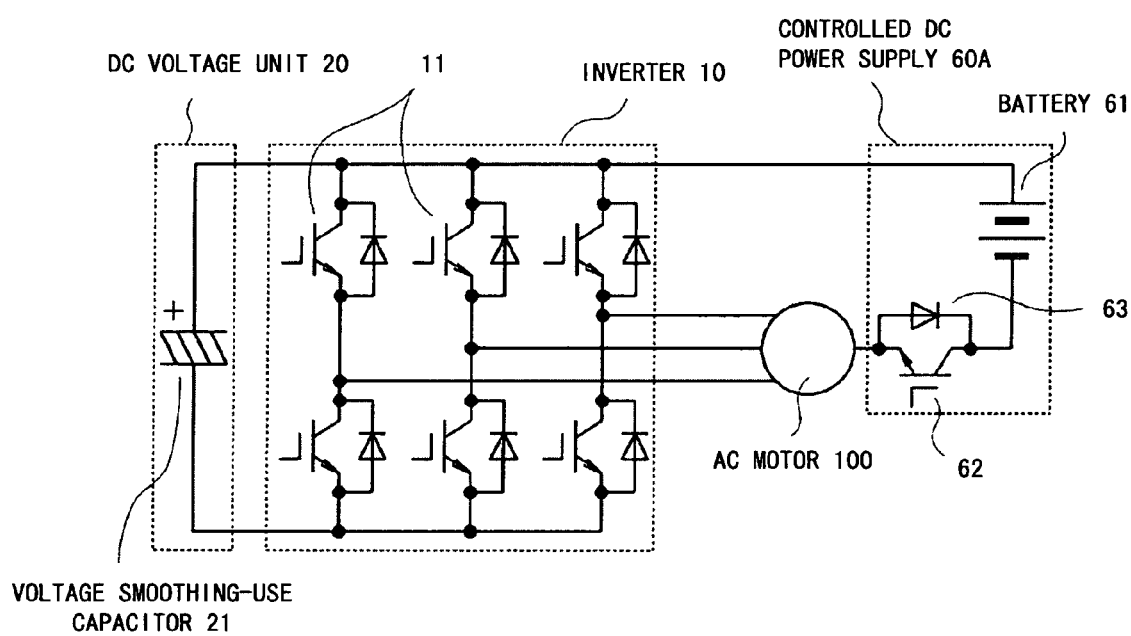
F I G. 6

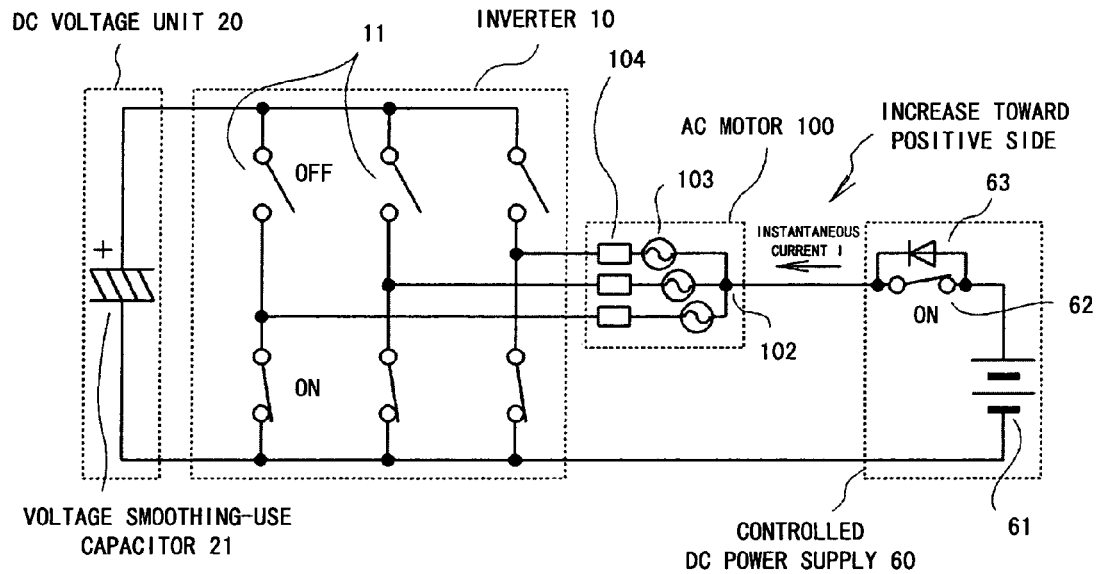
F I G. 8A
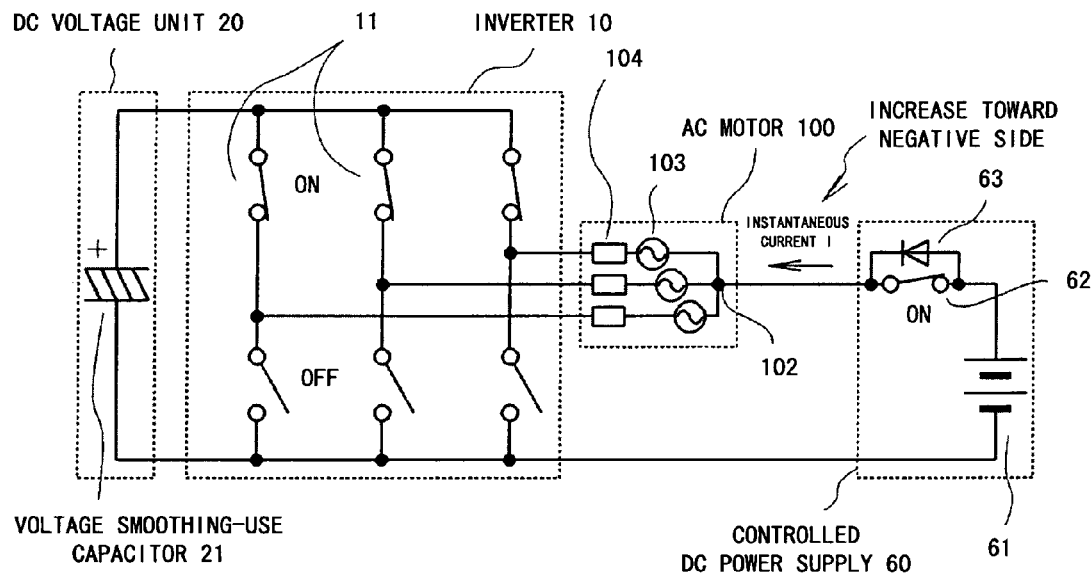
F I G. 8B

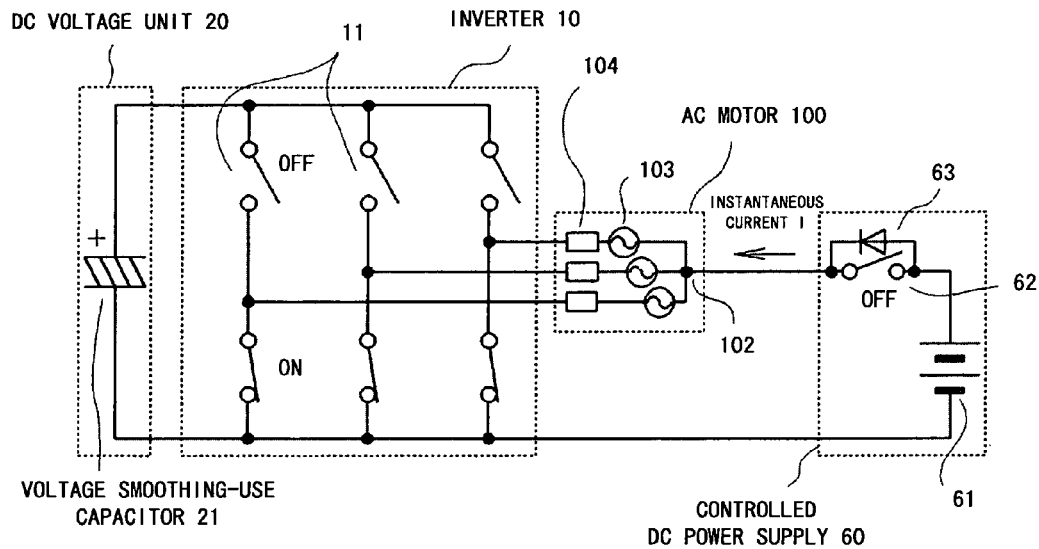
F I G. 8C
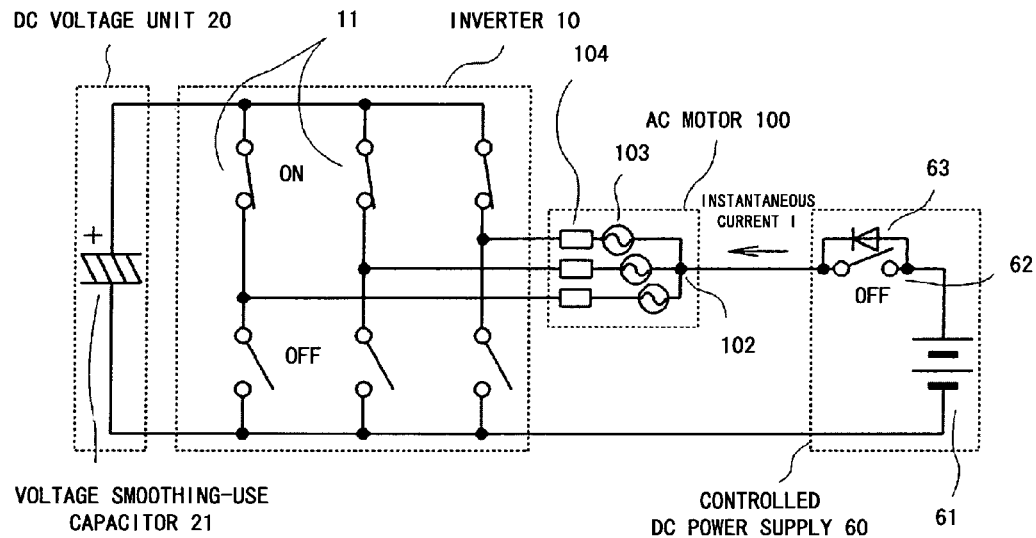
F I G. 8D

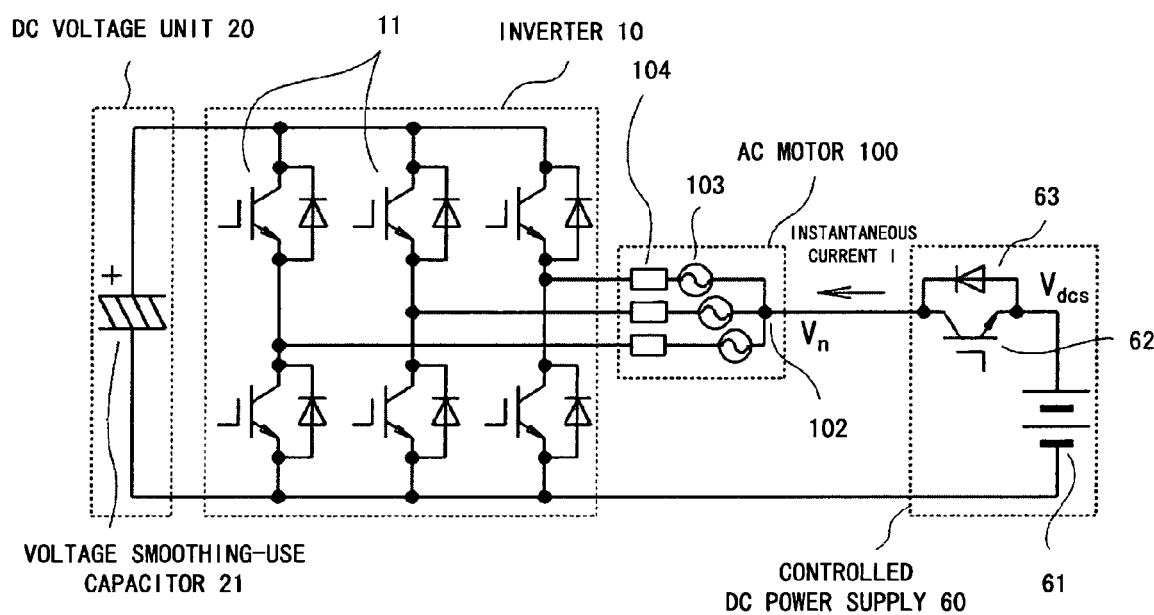
F I G. 8 E

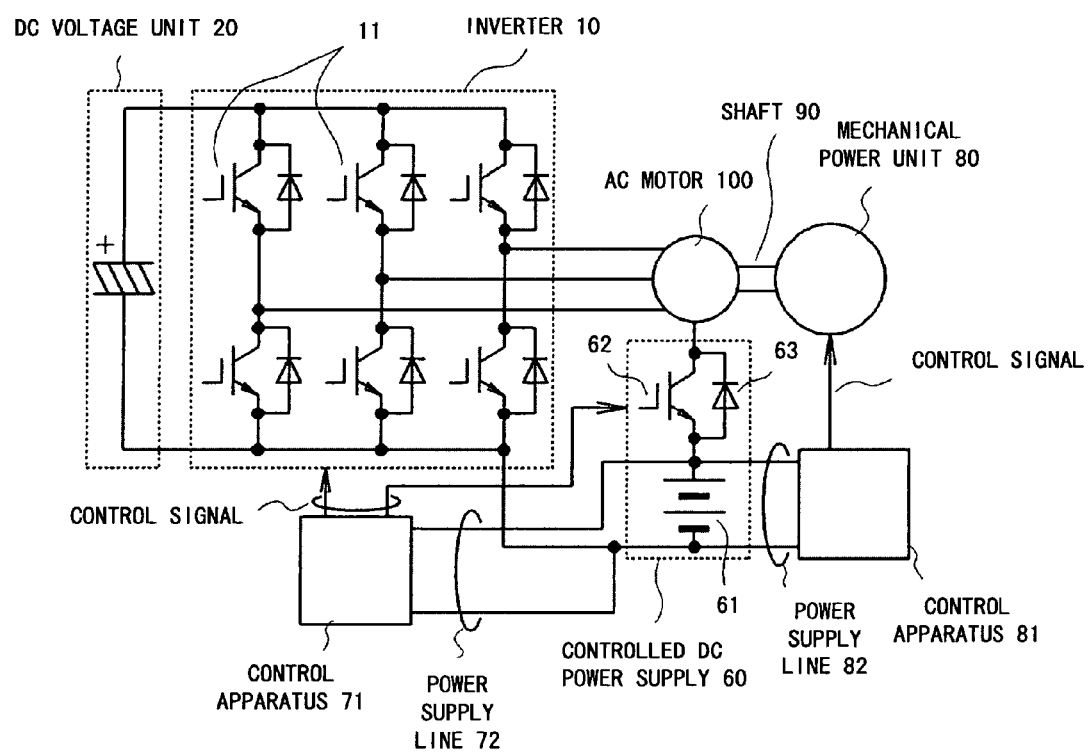
F I G. 1 1

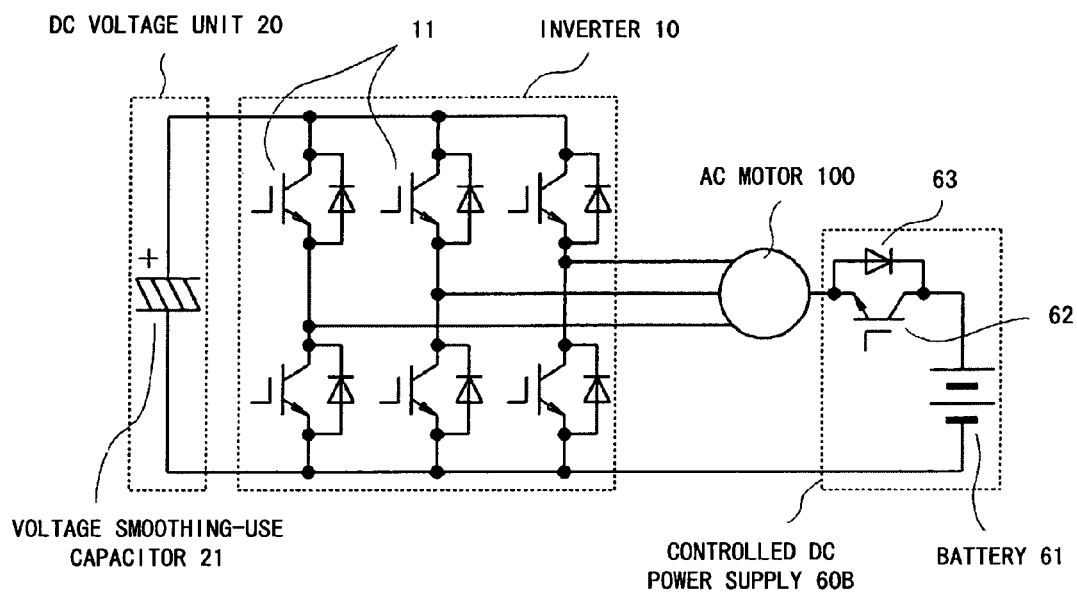
F I G. 1 3

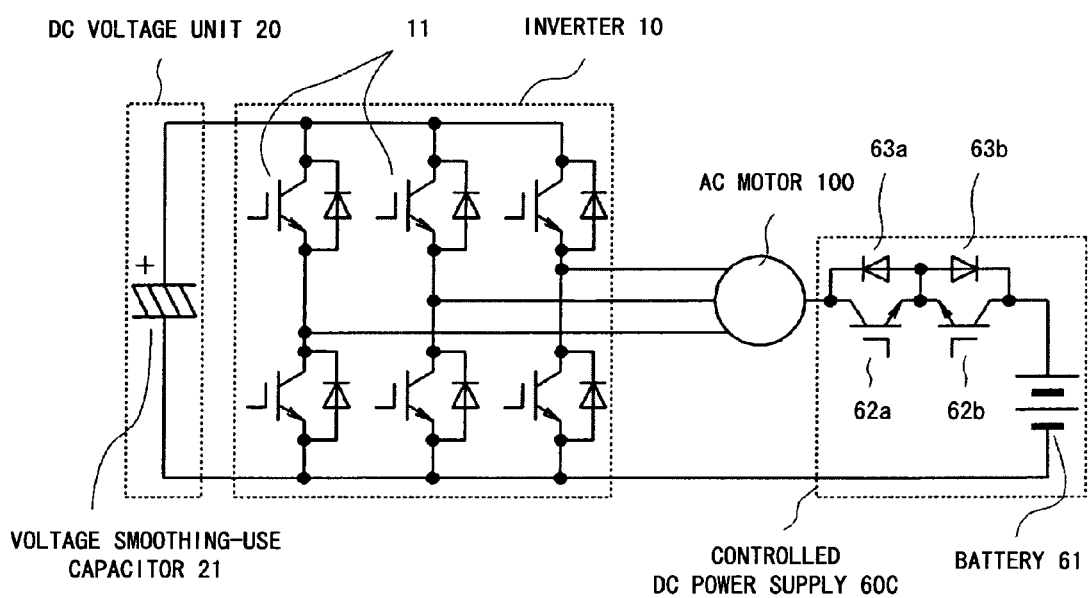
F I G. 1 4

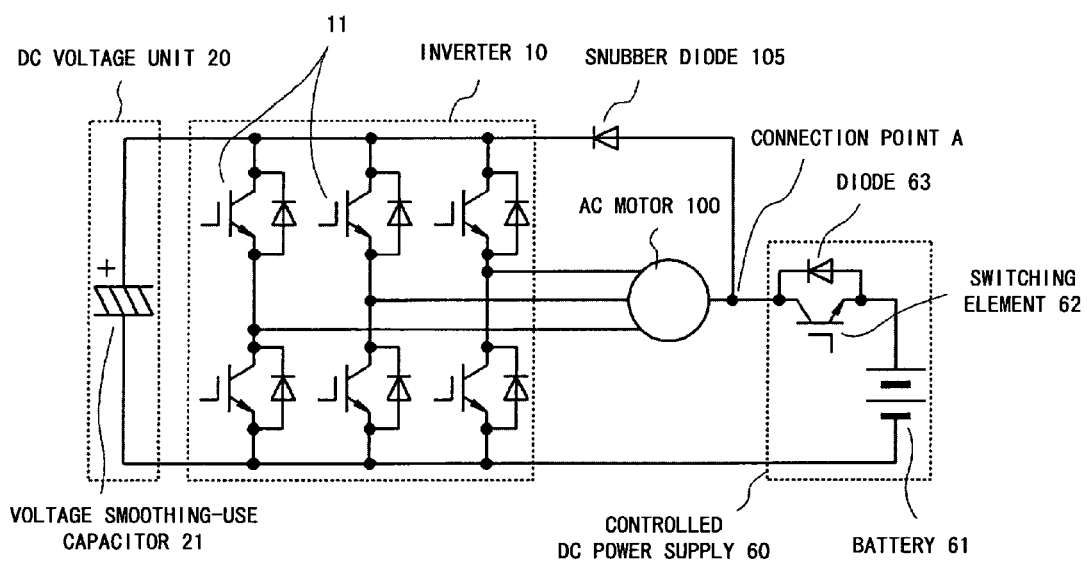
F I G. 1 5

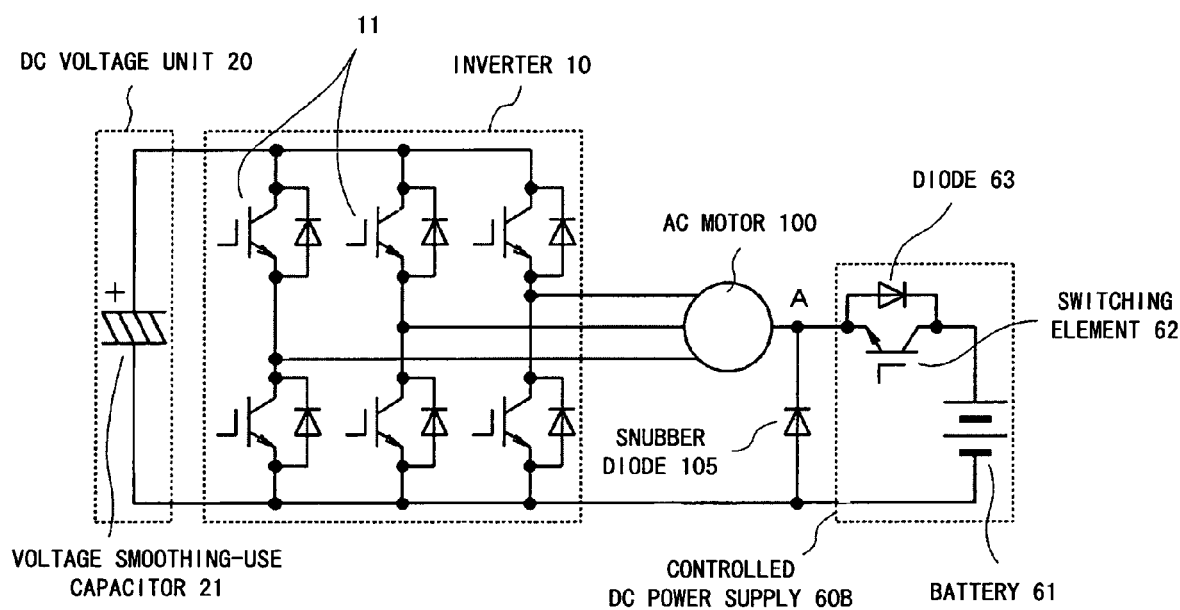
F I G. 16

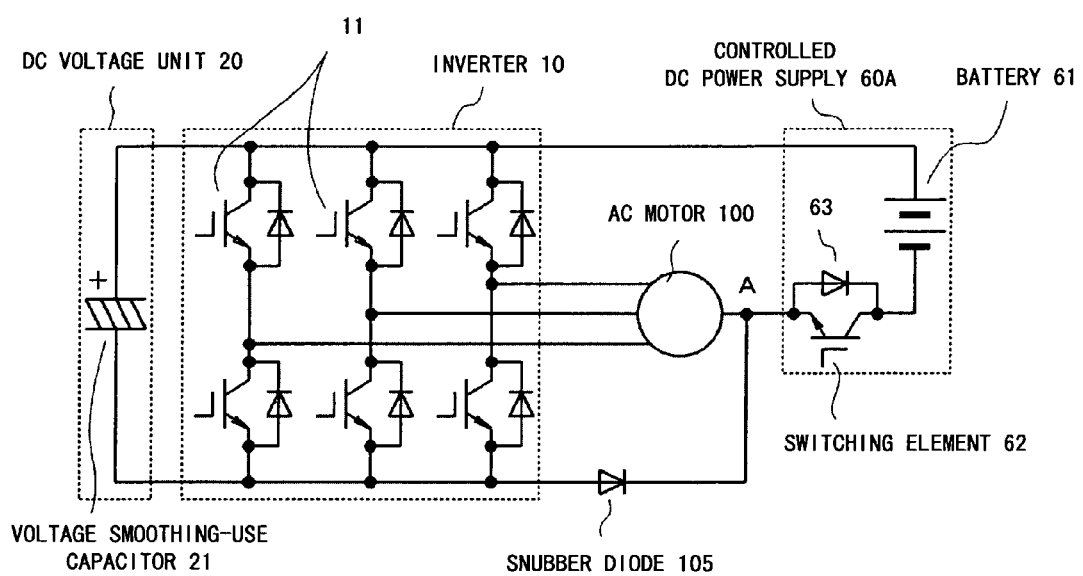
F I G. 1 7

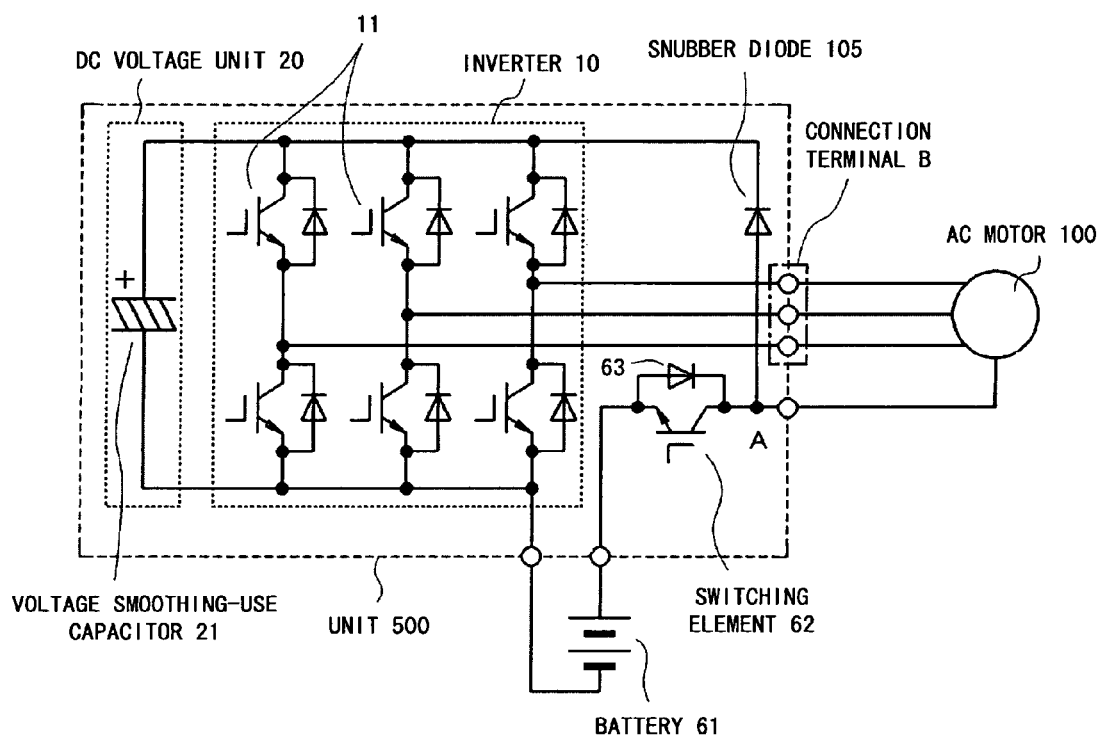
F I G. 1 9

US 7,982,426 B2

ELECTRIC POWER SYSTEM

RELATED APPLICATION

This application claims priority under 35 U.S.C. 119 to Japanese Application No. 2006-064276, filed Mar. 9, 2006, and Japanese Application No. 2006-318075, filed Nov. 27, 2006 which applications are incorporated herein by reference and made a part hereof.

BACKGROUND OF THE INVENTION

1. Field of the Invention

The present invention relates to an electric power system comprising an AC motor, a first DC voltage unit, a power converter such as an inverter for exchanging the power between the aforementioned components, and an auxiliary controlled DC power supply that is connected between the AC motor and first DC voltage unit, and in particular to an electric power system enabling a control of the controlled DC power supply by means of a simple configuration.

2. Description of the Related Art

FIG. 1 is a configuration diagram of an electric power system for driving an alternate current (AC) motor by means of an inverter, showing the case of the three-phase inverter and AC motor.

Referring to FIG. 1, the numeral 10 is an inverter constituted by a semiconductor switching element 11, the numeral 100 is an AC motor, and the numeral 20 is a direct current (DC) voltage unit constituted by a voltage smoothing-use capacitor 21.

The electric power system is configured to make the inverter 10 convert a DC power of the DC voltage unit 20 into an AC power and to control a power supplied to the AC motor 100. In this case, the voltage of the DC voltage unit 20 is maintained approximately at constant, and a peak value of an AC output voltage of the inverter 10 is fundamentally equal to or less than the voltage value of the DC voltage unit 20.

In order to exchange a large power between the inverter 10 and AC motor 100 for rotating it in high speed, an increase of an AC voltage applicable to the AC motor 100 from the inverter 10 by increasing the voltage of the DC voltage unit 20 is effective. Here, when using a storage battery (called as "battery" hereinafter) 30 as a DC voltage unit as shown in the drawing, the voltage of the battery 30 must be increased for increasing the DC voltage, requiring the number of serially connected batteries to be increased and hence causing a cost increase.

Meanwhile, the voltage of a battery usually has a tens (10s) % variation range against a reference value depending on a charged condition, requiring a system design in response to the variation range. This means, for example, the design must determine the maximum current of the motor so that a prescribed output can be obtained even if the voltage of the battery is at the lowest.

This results in creating problems of increasing a cost, volume and size such as increasing a coil lead diameter of a motor for allowing a large current, requiring a cooling mechanism responsive to an increased heat generation associated with the current flow.

Now turning to FIG. 2 which is a configuration diagram of an electric power system that has added a voltage booster (i.e., a step-up chopper) to the configuration shown in FIG. 1, aiming at solving the various problems described above.

Referring to FIG. 2, the numeral 31 is a low voltage battery, the 51 numeral is a DC reactor of which a terminal is connected to the positive electrode of the battery 31 and the other terminal is connected to a connection point of a pair of semiconductor switching elements 41 within the voltage booster 40 which is also parallelly connected to the DC voltage unit 20.

The configuration makes it possible to step up a DC input voltage of the inverter 10 by an operation of the voltage booster 40 and maintain the voltage of the DC voltage unit 20 high even when a low voltage battery 31 is used. It is also possible to control the voltage of the DC voltage unit 20 at constant by virtue of a function of the voltage booster 40 even if the voltage of the battery 31 fluctuates.

The voltage booster 40, however, commonly requires the DC reactor 51, hence ushering in problems anew such as increasing cost, size and weight of the overall system.

Furthermore, FIG. 3 is a configuration diagram of an electric power system noted in a later described reference patent document 1. The electric power system is configured to connect a battery 32 between a neutral point of a coil of the AC motor 100 and either of the negative or positive pole (i.e., the negative pole in the configuration of FIG. 3) of the DC voltage unit 20.

An outline of the operation of the electric power system shown in FIG. 3 is as follows.

There is a mode of turning on or off all switching elements 11 of the upper arm simultaneously and a mode of turning on or off all switching elements 11 of the lower arm simultaneously in the inverter 10. There is a leakage inductance in the AC motor 100.

The switching elements 11 of the upper arm, which turn on or off simultaneously, and the switching elements 11 of the lower arm, which turn on or off simultaneously, can be regarded as one switching element, respectively, while the leakage inductance of the AC motor 100 can be regarded as DC reactor. FIG. 4 is a result of accordingly drawing an equivalent circuit of the circuit shown in FIG. 3, comprehensibly showing equivalency to the voltage booster 40 and the peripheral circuit thereof shown in FIG. 2 in terms of a circuit configuration.

Referring to FIG. 4, the numeral 10' is equivalent to the inverter of FIG. 3 that is shown by one upper and lower arm by means of a zero-phase equivalency equivalent circuit, the numeral 101 is an equivalent to the leakage inductance of the AC motor 100, the numeral 321 is an ideal DC power supply equivalent to the battery 32 and the numeral 322 is an internal resistance of the battery 32.

A current flowing in the battery 32 can be regarded as so-called "zero-phase current" for the AC motor 100, fundamentally ineffective to a generated torque thereof. In fact, when the core of the AC motor 100 is magnetically saturated, a torque is changed because the magnetic flux of the motor influencing the torque is affected; the problem, however, can be alleviated by a design of the motor.

The electric power system shown in FIG. 3 is configured to control timings of turning on or off all of the switching elements 11 of the upper arm simultaneously, or all of the switching elements 11 of the lower arm simultaneously, thereby making it possible to control the power of the battery 32, that is, the voltage at a DC voltage unit of the inverter 10, without influencing the torque of the AC motor 100.

The major characteristic of the electric power system is, first, the leakage inductance equivalency 101 of the AC motor 100 performs a role of the DC reactor 51 in the configuration of FIG. 2, eliminating a necessity of the DC reactor 51, and furthermore, the switching elements 11 constituting the inverter 10 perform a role of the switching elements 41 of the voltage booster 40 in the configuration of FIG. 2, eliminating a necessity of an additional switching element as well, thereby enabling a simplification of a circuit configuration and a compact design of the entire system.

[Patent document 1] Registered Japanese Patent No. 3223842 (See paragraphs 0029, 0030, FIG. 10 in particular), which corresponds to U.S. Pat. Nos. 6,137,704 and 6,137,704. The latter US patent is a divisional application of the former US patent.

Here, in the case of attempting to utilize a voltage applied to the motor by the inverter 10' to the maximum in the conventional technique shown in FIG. 4 (that is, FIG. 3), a situation arises in which a power of the battery 32 cannot be controlled due to a limitation of a DC power supply voltage of the battery 32, resulting in being unable to utilize a power of the inverter 10' to its best. This can be explained as follows.

In order to control the power of the battery 32, an average voltage at the neutral point of the AC motor 100, to which the battery 32 is connected, relative to the negative pole of the DC voltage unit 20 needs to be approximately the same as the voltage of the battery 32 because an average current flowing therein is determined by the following expression 1:

$$I_{dcs}=(V_n-V_{dcs})/R_{dcs} \quad \text{[Expression 1]}$$

where:
$I_{dcs}$: average current value flowing in the battery 32
$V_n$: average voltage value at the neutral point of the AC motor 100 relative to the negative pole of the DC voltage unit 20
$V_{dcs}$: open voltage of the battery 32
$R_{dcs}$: internal resistance of the battery 32

That is, the $R_{dcs}$ is generally small, making the $(V_n-V_{dcs})$ relatively a small value, and also it needs to be $V_n>V_{dcs}$ if the battery is desired to be charged, while it needs $V_n<V_{dcs}$ if a power is desired to be obtained by discharging the battery 32, and therefore the $V_n$ needs to be controlled at "$V_{dcs}$ plus or minus equivalency of adjustment".

In the case of applying the maximum voltage to the AC motor 100 from the inverter 10', that is, of a modulation ratio of the inverter 10', being approximately "1", the $V_n$ ends up being fixed to approximately one half ($=E_{dc}/2$) of the voltage $E_{dc}$ of the DC voltage unit 20, making "adjustment allowance" of the $V_n$ almost disappear.

In such a case, the voltage of the battery 32 must be approximately $E_{dc}/2$, making a space for adjusting the $V_n$ disappear and resulting in being unable to control a power of the battery 32. This consequently makes it difficult to utilize the output of the inverter 10' at its best. Such a situation degrades a freedom of design of an electric power system, hampering an implementation.

SUMMARY OF THE INVENTION

The purpose of the present invention is to provide an electric power system increasing a freedom of design by eliminating a limitation of a battery voltage and improving practicality.

An invention noted in claim 1 is an electric power system, comprising: an alternate current (AC) motor; a first direct current (DC) voltage unit; a power converter, being connected between the AC motor and first DC voltage unit, for exchanging power between the aforementioned two components; and a controlled DC power supply which is connected between an arbitrary spot of a coil of the AC motor and a positive or negative electrode of the first DC voltage unit and which connects at least one semiconductor switching element and a second DC voltage unit in series.

An invention noted in claim 2 is the electric power system in the one according to claim 1, connecting the controlled DC power supply between a neutral point of a coil of the AC motor and a positive or negative electrode of a first DC voltage unit.

An invention noted in claim 3 is the electric power system in the one according to claim 1, wherein a second DC voltage unit is a storage battery.

An invention noted in claim 4 is the electric power system in the one according to claim 1, wherein a second DC voltage unit is an electrostatic capacity.

An invention noted in claim 5 is the electric power system in the one according to claim 1, supplying a power supply for a control apparatus of the power converter from a second DC voltage unit.

An invention noted in claim 6 is the electric power system in the one according to claim 5, equipping a mechanical power unit for providing the AC motor with an axial torque.

An invention noted in claim 7 is the electric power system in the one according to claim 6, supplying a power source for electrical components and electrical equipment required for the mechanical power unit from a second DC voltage unit.

An invention noted in claim 8 is the electric power system in the one according to claim 2, wherein an open voltage of a second DC voltage unit is one third or less of a voltage of a first DC voltage unit and also a diode of a polarity that discharges the second DC voltage unit is connected in parallel with the semiconductor switching element serially connected to the second DC voltage unit.

An invention noted in claim 9 is the electric power system in the one according to claim 2, wherein an open voltage of a second DC voltage unit is lower than a voltage of a first DC voltage unit and also two thirds or more of the voltage thereof, and a diode of a polarity that charges the second DC voltage unit is connected in parallel with the semiconductor switching element serially connected to the second DC voltage unit.

An invention noted in claim 10 is the electric power system in the one according to claim 2, wherein the semiconductor switching element serially connected to a second DC voltage unit constitutes a bidirectional switch capable of connecting or shutting off a current flow bi-directionally.

An invention noted in claim 11 is the electric power system in the one according to claim 2, wherein a negative electrode of a first DC voltage unit and that of a second DC voltage unit are mutually connected practically at the same DC potential, and either one of a diode connected in a direction starting from a connection point between the AC motor and semiconductor switching element toward a positive electrode of the first DC voltage unit as a forward direction, or a diode connected in a direction starting from the connection point between the AC motor and semiconductor switching element toward a negative electrode of the first DC voltage unit as a reverse direction, is comprised.

An invention noted in claim 12 is the electric power system in the one according to claim 2, wherein a positive electrode of a first DC voltage unit and that of a second DC voltage unit are mutually connected practically at the same DC potential, and either one of a diode connected in a direction starting from a connection point between the AC motor and semiconductor switching element toward a positive electrode of the first DC voltage unit as a forward direction, or a diode connected in a direction starting from the connection point between the AC motor and semiconductor switching element toward a negative electrode of the first DC voltage unit as a reverse direction, is comprised.

An invention noted in claim 13 is the electric power system in the one according to claim 1, constituting at least a first DC voltage unit, the power converter and semiconductor switching element as a single unit.

Note that the second DC voltage unit may be included in the aforementioned unit on an as required basis.

BRIEF DESCRIPTION OF THE DRAWINGS

FIG. 1 is a configuration diagram of an electric power system for driving an alternate current (AC) motor by means of an inverter;

FIG. 3 is a configuration diagram of an electric power system noted in a patent document 1;

FIG. 4 is a diagram of an equivalent circuit to that of FIG. 3;

FIG. 6 is a configuration diagram showing a modified example of the first embodiment;

FIG. 8A is a diagram describing an operation of the second embodiment;

FIG. 8B is a diagram describing an operation of the second embodiment;

FIG. 8C is a diagram describing an operation of the second embodiment;

FIG. 8D is a diagram describing an operation of the second embodiment;

FIG. 8E is a diagram describing an operation of the second embodiment;

FIG. 11 is a configuration diagram showing a fifth embodiment of the present invention;

FIG. 13 is a configuration diagram showing a sixth embodiment of the present invention;

FIG. 14 is a configuration diagram showing a seventh embodiment of the present invention;

FIG. 15 is a configuration diagram showing an eighth embodiment of the present invention;

FIG. 16 is a configuration diagram showing a modified example of the eighth embodiment;

FIG. 17 is a configuration diagram showing a ninth embodiment of the present invention;

FIG. 19 is a configuration diagram showing a tenth embodiment of the present invention.

DESCRIPTION OF THE PREFERRED EMBODIMENTS

The following is a description of the preferred embodiments of the present invention by referring to the accompanying drawings. The entirety of the following embodiments relates to a three-phase, two-level inverter; the present invention, however, is applicable regardless of the number of phases or the number of levels of an inverter.

Figure 2:
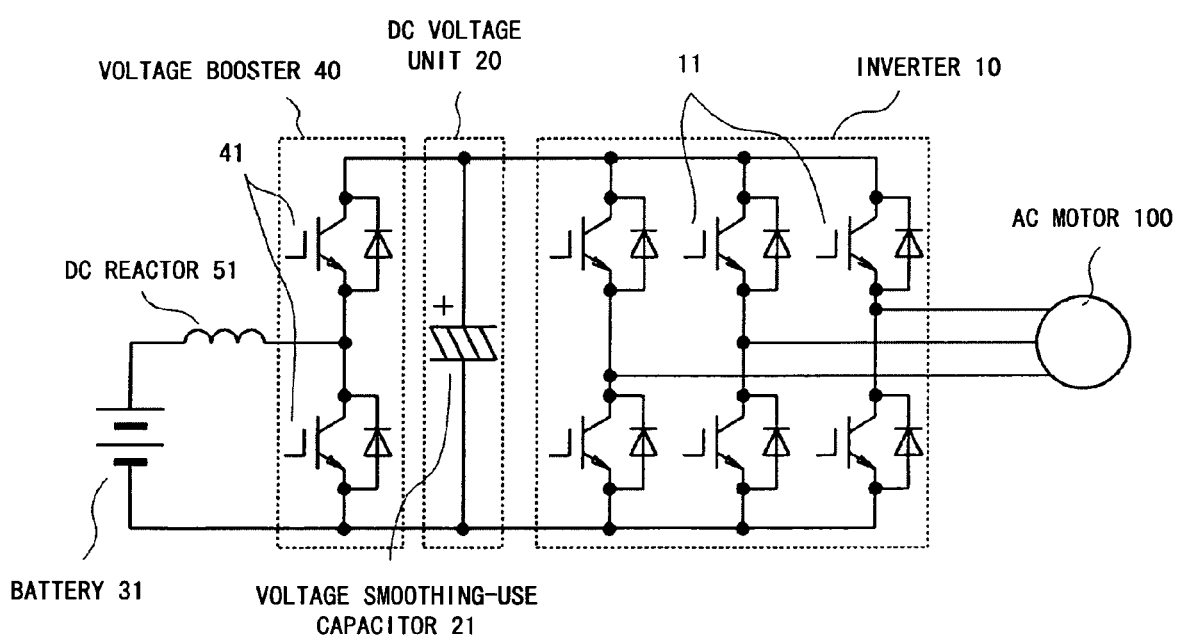
FIG. 2 is a configuration diagram of an electric power system that has added a voltage booster to the configuration shown in FIG. 1.
Figure 5:
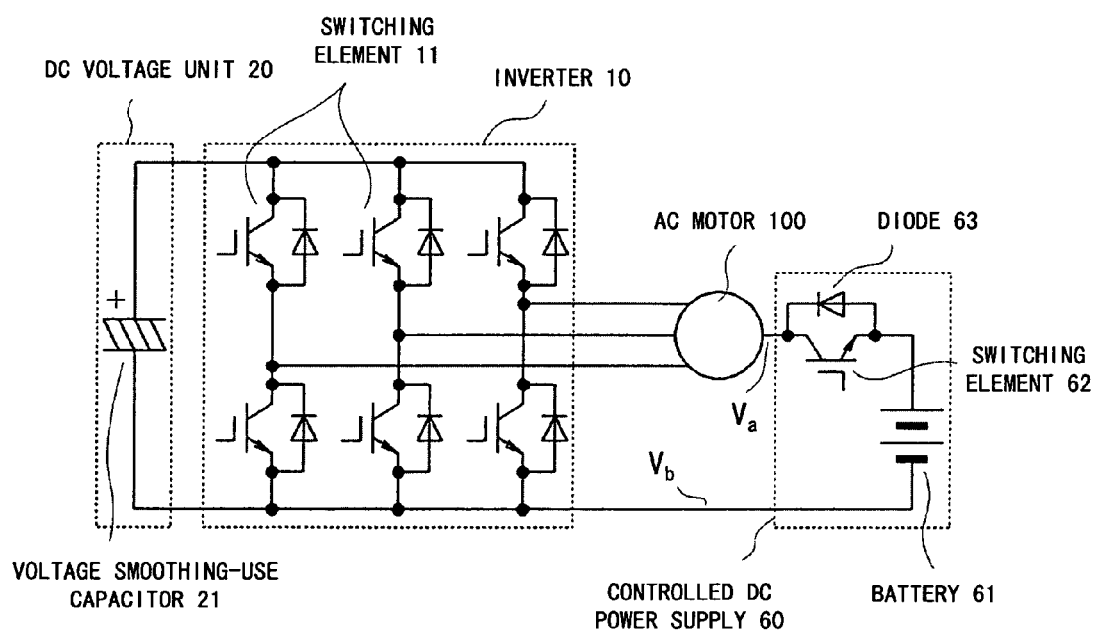
FIG. 5 is a configuration diagram showing a first embodiment of the present invention.

To begin with, FIG. 5 is a configuration diagram showing a first embodiment of the present invention, which is equivalent to the invention noted in claim 1.

The key point for solving the above described problem for the present invention lies in controlling an average voltage applied to a battery that is connected between an AC motor 100 and a DC voltage unit 20 at a value close to an open voltage $V_{dcs}$ of the battery. If this condition is satisfied, a connection point of the battery becomes arbitrary, and it may be connected between an arbitrary point of a coil of the AC motor and a positive or negative electrode of the DC voltage unit for example.

FIG. 5 is the first embodiment configured on the basis of such a viewpoint. The same component sign is assigned to the same constituent component as that of FIG. 3 in the showing of FIG. 5. Note that the following description names, for convenience, a DC voltage unit connected to a DC side of an inverter 10 as a first DC voltage unit according to the claim 1.

Referring to FIG. 5, a controlled DC power supply 60 is connected to one spot of a coil of an AC motor 100, e.g., an output terminal (at average voltage $V_a$) on an inverter 10 side, and a negative electrode (at average voltage $V_b$) of the DC voltage unit 20. A serial circuit of a battery 61 as a second DC voltage unit and a semiconductor switching element 62 such as an IGBT, in which a diode (i.e., a free-wheeling diode) 63 is inversely and parallelly connected, constitutes the controlled DC power supply 60 in which the collector of the switching element 62 is connected to the coil side of the AC motor 100, the emitter of the switching element 62 is connected to a positive electrode of the battery 61 and a negative electrode thereof is connected to a negative electrode of the DC voltage unit 20.

Note that a controlled DC power supply 60A may be connected between one spot of the coil of the AC motor 100 and a positive electrode of the DC voltage unit 20 shown in FIG. 6 as a modified example of the present embodiment.

One condition for making a power of the battery 61 controllable in the present embodiment is that, regarding a voltage (i.e., $V_a-V_b$) applied to the controlled DC power supply 60, a period in which the voltage ($V_a-V_b$) is higher than an open voltage $V_{dcs}$ when charging the battery 61, and a period in which the voltage ($V_a-V_b$) is lower than the $V_{dcs}$ when discharging the battery 61.

If the above condition is satisfied, a control of turning on or off (i.e., a high frequency switching) the switching element 62 connected to the battery 61 in series adjusts an average voltage applied to the battery 61 so as to change a current flowing therein, thereby making it possible to adjust the power of the battery 61.

An inverter allows an adjustment of the average potential at each point of the coil of a motor, which is a load, by a ratio of turning on to off of a switching element, and therefore the fact means that "it is possible to satisfy the above described condition". The problem here is to devise so as not to influence the operation of the motor to the best of possibility when adjusting the average potential at one point of the coil of the motor to which a controlled DC power supply is connected so as to satisfy the above described condition. For the purpose, the solution is to connect the controlled DC power supply to the neutral point of the coil of the motor as described later.

Note that the switching element used for the controlled DC power supply 60 may use a bidirectional switch capable of connecting and shutting off currents flowing bi-directionally, in addition to the unidirectional switching element such as commonly used IGBT or MOSFET as shown in the drawing.

Here, a Laid-Open Japanese Patent Application Publication No. 2000-324857 (Title of invention: diverse power supply apparatus; equipment and motor drive apparatus comprising the power apparatus and hybrid vehicle: paragraph [0032], FIG. 6, et cetera) as another conventional technique has disclosed a technique of connecting a low voltage battery between a neutral point of an AC motor and a negative electrode of a DC voltage unit of an inverter by way of a relay contact.

That is, there is a commonality with the present embodiment where a serial circuit of a battery and switch means is connected between an AC motor and one end of a DC voltage unit; the relay contact used for the conventional technique, however, is equipped for the purpose of protecting the battery, which is a low voltage electrical system, from a high voltage electrical system on the inverter side by shielding the battery therefrom, and therefore it does not aim at a current control for the battery 61 as in the case of the switching element 62 according to the present embodiment, and furthermore, the conventional technique is not capable of a current control nor is it fundamentally capable of a power control, making it different from the present embodiment.

The present embodiment makes it possible to control an average voltage applied to the battery 61 to a value around the open voltage $V_{dcs}$ thereof as the center value.

In other words, the average voltage is never fixed on the basis of a voltage $E_{dc}$ of the DC voltage unit 20 and therefore it is possible to drive the AC motor 100 by utilizing an output voltage of the inverter 10 to its maximum while controlling the power of the battery 61.

Figure 7:
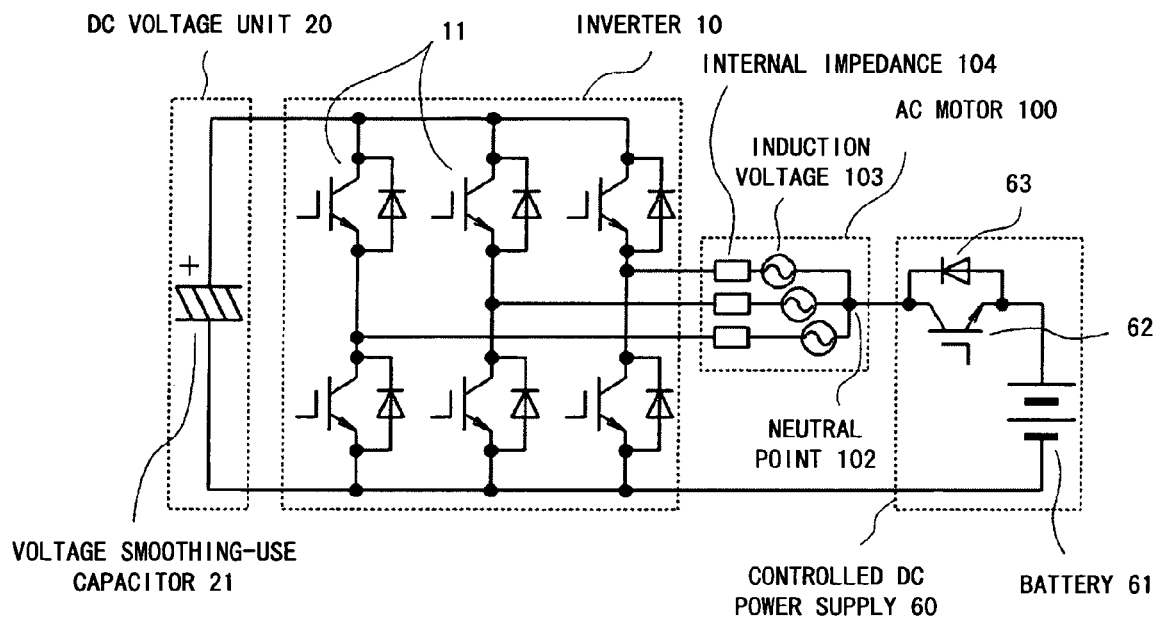
FIG. 7 is a configuration diagram showing a second embodiment of the present invention.

Next, FIG. 7 is a configuration diagram showing a second embodiment of the present invention, which is equivalent to the invention noted in claim 2.

A difficulty accompanies a current control of the battery 61 when the controlled DC power supply 60 is connected between the negative electrode of the DC voltage unit 20 and the output terminal (i.e., the terminal on the inverter 10 side) of the AC motor 100 in the configuration shown in FIG. 5 because the voltage applied to the controlled DC power supply 60 is substantially varied by a switching condition of the inverter 10. Also, in the state of the switching element 62 of the controlled DC power supply 60 being turned on, a state is created where the controlled DC power supply 60 is practically shorted by the switching element 11 of the inverter 10 or the DC voltage unit 20 is directly connected to the controlled DC power supply 60, thereby allowing an instantaneous excessive current flowing therein and bringing about the problem of an increased loss and heat generation.

In order to lessen these problems, the controlled DC power supply 60 may better be connected to an internal terminal of the coil of the AC motor 100 in place of being directly connected to the output terminal thereof. This configuration lessens the amplitude of a motor voltage applied to the controlled DC power supply 60 and also connects an impedance of the coil of the AC motor 100 serially to the controlled DC power supply 60, thereby making it possible to prevent an excessive current from flowing.

Particularly in the case of a neutral point 102 existing in the coil of the AC motor 100 as shown in FIG. 7, connecting one end of the controlled DC power supply 60 to the neutral point 102 minimizes the amplitude of the motor voltage applied to the controlled DC power supply 60. Also in this case, the other end of the controlled DC power supply 60 may be connected to either of the positive or negative electrode of the DC voltage unit 20. Note that the numeral 103 indicates an induction voltage of the AC motor 100 and the numeral 104 indicates the internal impedance thereof in the showing of FIG. 7.

The following expression is true in the configuration of FIG. 7:

$$I_{dcs}=(K_c*V_n-V_{dcs})/R_{dcs};\qquad\text{[Expression 2]}$$

where:

$I_{dcs}$: average current value flowing in the battery 61

$K_c$: coefficient adjusted by turning on or off the switching element 62 of the controlled DC power supply 60

$V_n$: average voltage value at the neutral point of the AC motor 100 against the negative pole of the DC voltage unit 20

$V_{dcs}$: open voltage of the battery 61

$R_{dcs}$: internal resistance of the battery 61

That is, adjusting the coefficient $K_c$ by switching the switching element 62 makes it possible to maintain the $I_{dcs}$ as a target and adjust at least either of charging or discharging the battery 61 freely.

FIGS. 8A through 8E are diagrams for describing an operation of the second embodiment.

The present embodiment is configured to change over the operation mode shown in FIGS. 8A through 8E by an operation of each switching element, thereby enabling a control of the power of the battery 61. The following describes the respective operation modes.

Note that the following description names the DC voltage unit 20 as a first DC voltage unit 20.

Also, note that the following description premises that the voltage of the first DC voltage unit 20 is higher than that of the battery 61 (i.e., the second DC voltage unit).

Mode of FIG. 8A

It is in the state of the entire switching elements 11 of the lower arm of the inverter 10 being turned on and the switching element 62 of the controlled DC power supply 60 being turned on. Note that the signs are simplified in FIGS. 8A through 8D so as to make out easily the respective turn-on and -off states of the individual switching elements 11 and 62.

In this mode, the battery 61 is shorted by way of a zero-phase equivalency (i.e., a leakage inductance and resistance) of the internal impedance 104 of the AC motor 100, and therefore a current of the battery 61 increases in the arrow direction (i.e., the positive direction) of the drawing. That is, this state puts the battery 61 in a discharging state.

Mode of FIG. 8B

It is in the state in which the entire switching elements 11 of the upper arm of the inverter 10 are turned on and the switching element 62 of the controlled DC power supply 60 is turned on.

In this mode, the voltage of the first DC voltage unit 20 is applied to the battery 61 by way of a zero-phase equivalency of the internal impedance 104 of the AC motor 100, and therefore a current of the battery 61 increases opposite to the arrow direction (i.e., the negative direction) of the drawing. That is, this state puts the battery 61 in a charging state.

Mode of FIG. 8C

It is in the state in which the entire switching elements 11 of the lower arm of the inverter 10 are turned on and the switching element 62 of the controlled DC power supply 60 is turned off.

In this mode, the operation is the same of that of FIG. 8A as a result of a function of the diode 63, thereby putting the battery 61 in a discharging resulting from increasing the current therein in the positive direction.

Mode of FIG. 8D

It is in the state in which the entire switching elements 11 of the upper arm of the inverter 10 are turned on and the switching element 62 of the controlled DC power supply 60 is turned off.

In this mode, when the current of the battery 61 flows in the arrow direction (i.e., the positive direction) of the drawing, the existence of the diode 63 decreases the current eventually to zero. Note that a current does not flow opposite to the arrow direction (i.e., the negative direction) of the drawing.

Mode of FIG. 8E

FIG. 8E shows the state in which the entire switching elements 11 of the upper arm of the inverter 10 are other than being turned on and the entire switching elements 11 of the lower arm of the inverter 10 are other than being turned on and the switching element 62 of the controlled DC power supply 60 is turned on or off.

In this mode, an increase or decrease of the current of the battery 61 is changed by a potential at the neutral point of the AC motor 100 and a state (of being turned on or off) of the switching element 62. Generally in this state, however, an average value $V_n$ of a neutral point voltage of the AC motor 100 is approximately constant if the motor is in a steady state, and based on this assumption, the current of the battery 61 can be controlled as shown in the above expression 2.

In particular, if the open voltage $V_{dcs}$ of the battery 61 is lower than $E_{dc}/2$, the $V_n$ generally becomes $E_{dc}/2$ and therefore turning on and off the switching element 62 of the controlled DC power supply 60 in a state of $V_n > V_{dcs}$ makes it possible to control the average value of the battery current.

As described above, since there is a mode for increasing the current of the battery 61 in the positive and negative directions in accordance with the state of the switching elements 11 and 62 being turned on and off, a changeover of these modes appropriately makes it possible to control an average current of the battery 61, that is, the charging and discharging thereof.

Thusly discharging the battery 61 and charging the first DC voltage unit 20 with the power of the battery 61 by way of the inverter 10' that is equivalent to the voltage booster as in the case of FIG. 4 make it possible to drive the AC motor 100 by using the DC power of the DC voltage unit 20. Contrarily, it is possible to charge the battery 61 of the controlled DC power supply 60 with a power of a generator by operating the AC motor 100 as a generator.

Putting the above description in other words, a control of turning on and off the switching element 62 of the controlled DC power supply 60 makes it possible to adjust the coefficient Kc shown in the expression 2.

Note that each of the above embodiments allows an employment of an arbitrary configuration of the second DC voltage unit. In particular, if the second DC voltage unit is a battery (i.e., a storage battery), and if the AC motor 100 is in a regenerative state in which the motor generates electricity as a result of obtaining a torque from a mechanical power source, as described in the claim 3 and the respective embodiments, an effective utilization of energy is enabled by storing the regenerated power in a battery and using the power thereof for driving a motor when the motor becomes a state of being driven.

Meanwhile, when using a (static electricity) capacitor (e.g., an electric double layer capacitor, et cetera) as a second DC voltage unit as noted in the claim 4, the capacitor is more advantageous than a battery in terms of its capability of exchanging an instantaneous power, high efficiency and long life, although it is inferior to a battery for its storage capacity.

Figure 9:
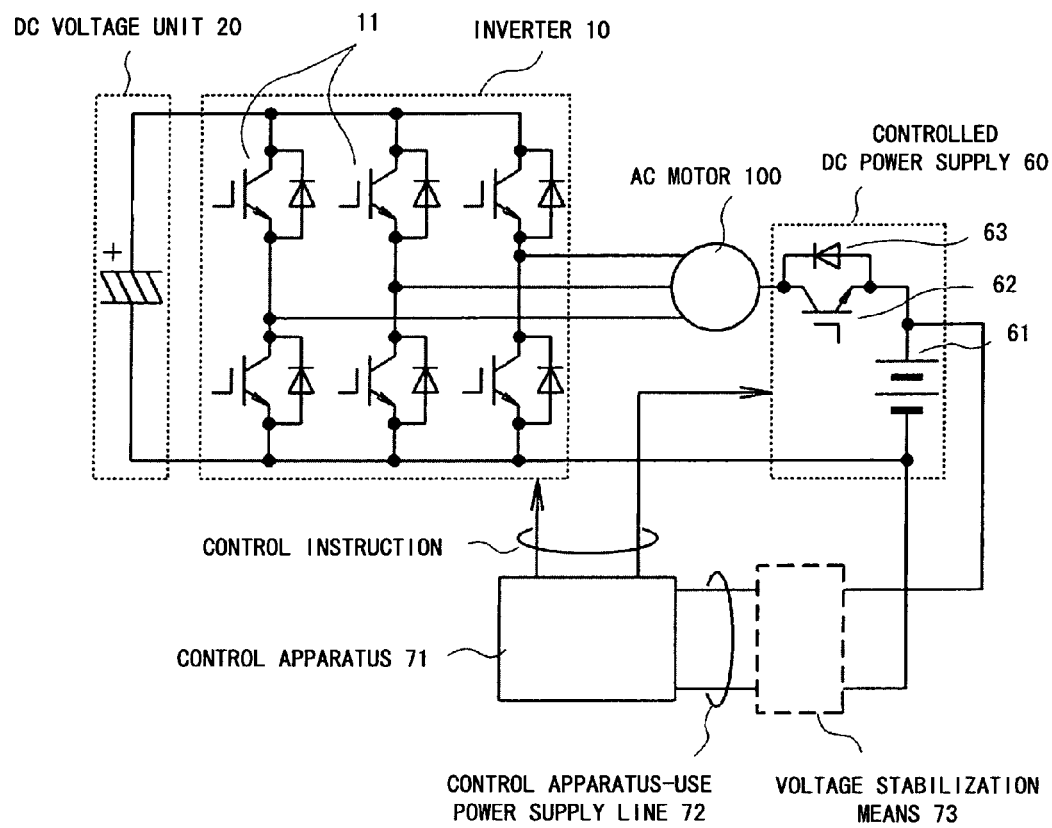
FIG. 9 is a configuration diagram showing a third embodiment of the present invention.

Next, FIG. 9 is a configuration diagram showing a third embodiment of the present invention, which is equivalent to the invention noted in claim 5.

The electric power system according to the present invention requires a control apparatus naturally for controlling a power converter such as the inverter 10 and controlled DC power supply 60 or 60A, and these control apparatuses generally consume power in the neighborhood of ones watts to tens watts. A configuration of obtaining a power for the control apparatus from a separate source, e.g., a commercial power source, loses independence of the system.

On the other hand, it is possible to configure a power supply for the control apparatus by connecting a DC/DC converter to the first DC voltage unit 20 likewise a normal inverter; a voltage thereof, however, is not established in an initial state in which the inverter is being stopped and therefore a power cannot be supplied to the control apparatus. That is, inconvenience arises for starting up the system.

In order to solve the above problem, what is effective is to supply the control apparatus 71 with a power for controlling the inverter 10 and controlled DC power supply 60 from the battery 61 that is a second DC voltage unit by way of the power supply line 72 as shown in FIG. 9. Such a configuration enables the battery 61 to maintain a voltage even if the inverter 10 is being stopped, thereby making it possible to start up the inverter 10 without a problem and improve independence of the apparatus.

Meanwhile, a voltage of the battery 61 is generally lower than that of the first DC voltage unit 20 and it is closer to a supply voltage to the control apparatus 71, enabling it as a configuration for supplying the control apparatus 71 with a power directly. It is also possible to achieve simplification, high efficiency and low cost of the configuration even in the case of making the voltage stabilization means 73 such as a DC/DC converter intervene because a voltage difference between the input and output is small.

Figure 10:
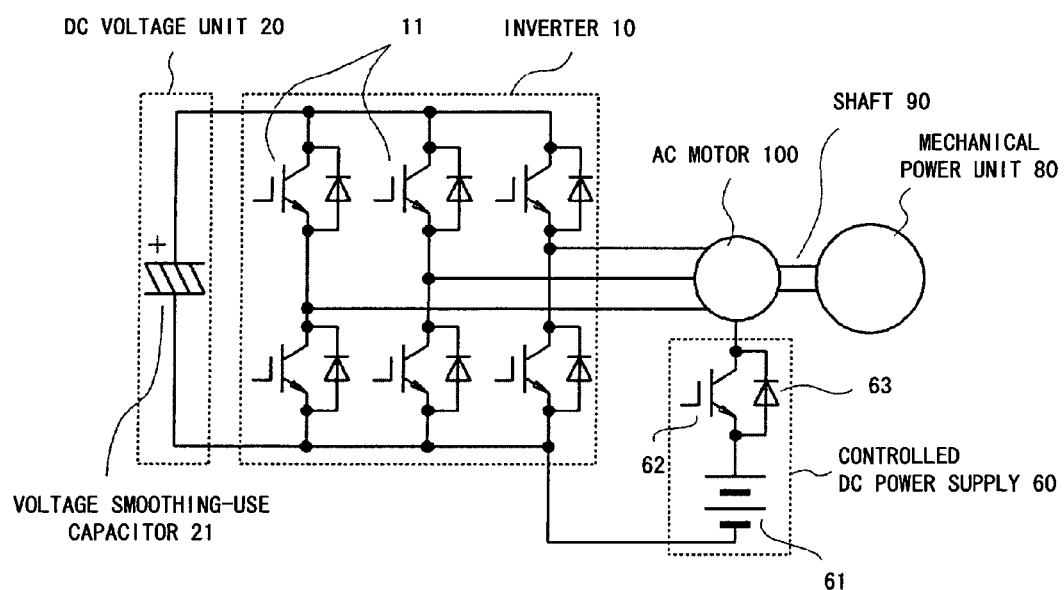
FIG. 10 is a configuration diagram showing a fourth embodiment of the present invention.

Next, FIG. 10 is a configuration diagram showing a fourth embodiment of the present invention, which is equivalent to the invention noted in claim 6.

An application of the power system to an apparatus, such as an internal combustion engine or a windmill, for generating a mechanical power makes it possible to configure a starter, power generation system, or a hybrid drive system. That is, to connect so that an axial torque is given to the AC motor 100 from the mechanical power unit 80, specifically, the output shaft of the mechanical power unit 80 and the rotation shaft of the AC motor 100 with the shaft 90, as shown in FIG. 10.

The above described configuration makes it possible to employ the power system according to the present invention as a starter and a generation system converting a mechanical power to an electric power, and moreover as a hybrid drive system that improves a drive force by combining the power of the AC motor 100 with that of the mechanical power and applying a regenerative braking system by reversing both of the power against each other in the case of the mechanical power unit 80 being an internal combustion engine.

FIG. 11 is a configuration diagram showing a fifth embodiment of the present invention, which is equivalent to the invention noted in claim 7.

The present embodiment is configured to supply a power required at a mechanical power unit 80 from a battery 61, which is a second DC voltage unit, by way of a power supply line 82 and a control apparatus 81, as an evolution of the configuration of FIG. 10.

This is a configuration for a battery 61 to supply power to a spark plug(s) for example in the case of the mechanical power unit 80 being an internal combustion engine, to the various electrical components and electrical equipment such as a fan and a pump that are comprised by the system in need when applying the present invention to an automobile.

The present embodiment is configured to supply the mechanical power unit 80 with an electric power from the battery 61, thereby making it possible to operate the system independently by virtue of the axial torque of the mechanical power unit 80. Therefore, there is no longer a necessity of connecting a commercial power source purposely for obtaining various powers required in the inside of the power system, hence contributing to reductions of an initial cost and running cost of the system.

Note that a power to the control apparatuses 71 and 81 shown in FIG. 11 may be supplied by way of voltage stabilization means as in the case of FIG. 9, although the configuration is not shown herein.

Figure 12:
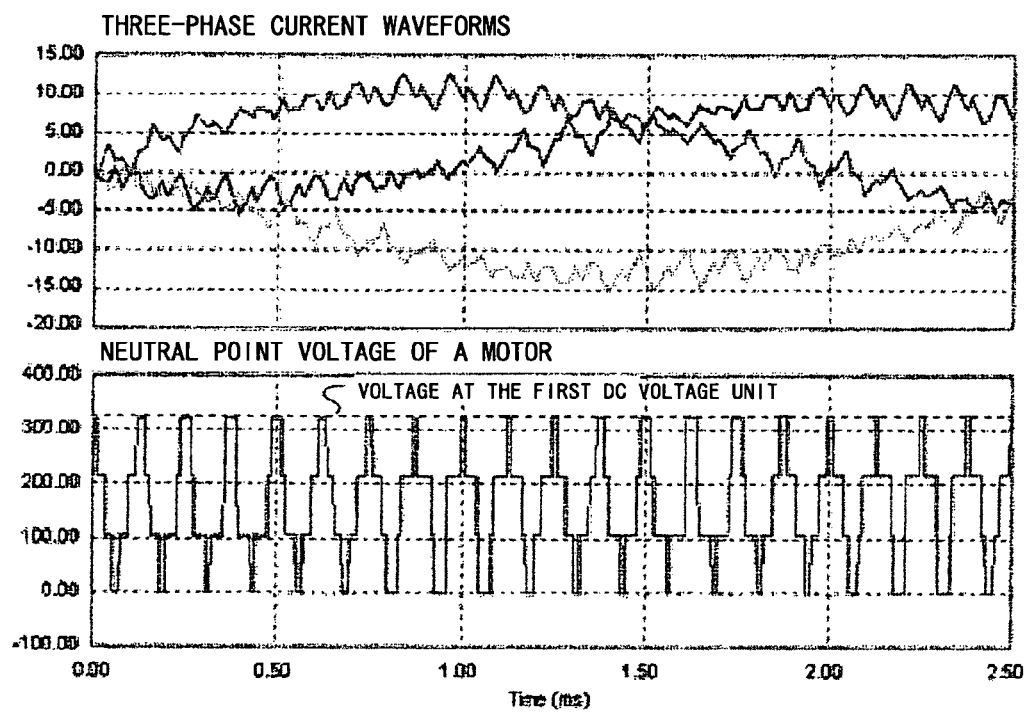
FIG. 12 is a diagram showing a three-phase current waveform, and a neutral point voltage waveform, of a motor when driving a motor in which a battery is not connected to a neutral point of a three-phase coil by employing a common three-phase inverter.

Here, FIG. 12 is a diagram showing a three-phase current waveform, and a neutral point voltage waveform, of a motor when driving a three-phase AC motor in which a battery is not connected to a neutral point of a coil by employing a common three-phase inverter, showing the case of PWM-controlling the inverter by employing a triangular wave carrier comparison system.

As shown in the drawing, it is understood that the neutral point voltage changes in four levels, i.e., the level "0", voltages $E_{dc}$ of the first DC voltage unit, $E_{dc}/3$ and $2E_{dc}/3$. This is a known fact as an operation of an inverter. At this point, a relationship of an on/off state of the switching element of an inverter with a neutral point voltage can be summarized as shown in the table 1.

TABLE 1

| | Potential at neutral point | | | |
|---|---|---|---|---|
| | 0 | $E_{dc}/3$ | $2E_{dc}/3$ | $E_{dc}$ |
| State of inverter | All lower arms are turned on | Two lower arms are turned on; One upper arm is turned on | One lower arm is turned on; Two upper arms are turned on | All upper arms are turned on |

The states in which the neutral point is "0" and $E_{dc}$ are both the output terminals being shorted for the motor, and therefore a torque of the motor is unaffected regardless of a state of the inverter.

At this point, let it be considered the case of the controlled DC power supply 60 comprising a battery 61 and a switching element 62, and the switching element 62 further comprising a diode 63 that is parallelly connected inversely to the direction of charging the controlled DC power supply 60 as in the case of FIG. 5, where a voltage of the battery 61 is assumed to be equal to or lower than $E_{dc}/3$.

Assuming that the switching element 62 is turned off and that the state of the potential at the neutral point (shown in FIG. 12) being "0", that is, the entire switching elements 11 of the lower arm of the inverter 10 being turned on, is replaced by a state of the entire switching elements 11 of the upper arm of the inverter 10 being turned on, then the voltage applied to the battery 61 from the motor 100 is constantly higher than the voltage of the battery 61 and therefore the diode 63 is applied with a reverse bias and no current flows therein.

Meanwhile, purposely creating a state in which the entire switching element 11 of the lower arm of the inverter are turned on makes a neutral point voltage "0", places the diode 63 in a forward-bias and lets a current flowing from the battery 61. A transition from the state of the entire switching element 11 of the lower arm of the inverter 10 being turned on to another state in the state of the current thusly flowing charges the first DC voltage unit 20 by virtue of energy stored by the current flowing in a leakage inductance of the AC motor 100. This action is a step-up operation of charging the first DC voltage unit 20 by virtue of the battery 61 as power supply.

Contrarily, a turning-on of the switching element 62 charges the battery 61 except in the state of the entire switching elements 11 of the lower arm being turned on.

As described above, the controls of turning on or off the switching elements 11 of the inverter 10 and the switching element 62 of the controlled DC power supply 60 make it possible to charge or discharge the battery 61 freely and make a current flowing in the battery 61 zero ("0") as an instantaneous value, providing a high controllability of the power.

An associated thinking of the above description makes a person familiar with the art understand a fact that a similar effect is obtained by setting a voltage of the battery 61 equal to or higher than $2E_{dc}/3$ and less than $E_{dc}$, and by reversing a polarity of the switching element 62 from the case of FIG. 5.

FIG. 13 is a configuration diagram showing a sixth embodiment of the present invention employing a switching element 63 of a reverse polarity to the case of FIG. 5, which is equivalent to the invention noted in claim 9. That is, the six embodiment is configured such that an open voltage of a second DC voltage unit (i.e., a battery 61) is lower than a voltage of a first DC voltage unit 20 and also equal to or higher than two thirds of a voltage thereof. Note that the numeral 60B shown in FIG. 13 is a controlled DC power supply having a different polarity of the switching element 62 and diode 63 from that of the controlled DC power supply 60 shown in FIG. 5.

In the present embodiment, by replacing the state of the neutral point voltage $E_{dc}$, shown in FIG. 12, that is, the state of the entire switching elements 11 of the upper arm of the inverter 10 being turned on, with a state of the entire switching elements 11 of the lower arm of the inverter 10 being turned on, if turns off the switching element 62, consequently stops a current flow in the battery 61. Then, a turning-off the entire switching elements 11 of the upper arm charges the battery 61.

Moreover, turning on the switching element 62, and repeating the state of the entire switching elements 11 of the upper arm being turned on and other states alternately by changing a ratio between the states enable a control of charging and discharging the battery 61.

FIG. 14 is a configuration diagram showing a seventh embodiment of the present invention, which is equivalent to the invention noted in claim 10.

As described above (FIG. 12, FIG. 13), a provision of a limit to the voltage of the battery 61 and a setup of a polarity of the serially connected switching element 62 in accordance with the limit make it possible to improve a controllability of the power. Also in the case of the voltage of the battery 61 being at a random value between "0" and $E_{dc}$, a use of a bidirectional switch enabling a flow and shut-off of a current in both directions by combining switching elements 62a and 62b with diodes 63a and 63b, respectively, as the controlled DC power supply 60C shown in FIG. 14 makes it possible to accomplish the same controllability of the power as the above two embodiments (FIG. 12, FIG. 13).

As is apparent from the above description, this configuration is particularly suitable in the case of a voltage of the battery 61 between $E_{dc}/3$ and $2E_{dc}/3$.

Next, FIG. 15 is a configuration diagram showing an eighth embodiment of the present invention, which is equivalent to the invention noted in claim 11.

In the circuit shown by FIG. 5 as an example, turning off the switching element 62 in the state of a current flowing in the switching element 62 that is serially connected to the battery 61 within the controlled DC power supply 60, that is, of a zero-phase current flowing in an AC motor 100 makes a voltage at the connection point between the switching element 62 and AC motor 100 climb rapidly because a current due to a leakage impedance drops rapidly. The voltage may exceed a dielectric strength of the switching element 62, possibly breaking it down.

The eighth embodiment shown in FIG. 15 is a configuration for avoiding the above problem. That is, a snubber diode 105 is connected in a polarity of the direction from the connection point A between the AC motor 100 and switching element 62 toward the positive electrode of the first DC voltage unit 20 as the forward direction as shown in FIG. 15.

If a voltage at the connection point A climbs rapidly as a result of the switching element 62 being turned off in the configuration of FIG. 15 and when the voltage exceeds a voltage of the first DC voltage unit 20, then the snubber diode 105 shifts to a conductive state and the voltage at the connection point A is clamped by the voltage of the first DC voltage unit 20.

Therefore, a breakdown of the switching element 62 can be prevented without substantially increasing a dielectric strength thereof. Also, when the voltage at the connection point A is clamped by that of the first DC voltage unit 20, the current flowing in the connection point A gradually decreases to zero before long so that the snubber diode 105 blocks a revered direction current, thereby making the current zero.

FIG. 16 shows a modified example of the eighth embodiment.

The switching element 62 at the controlled DC power supply 60 can be connected in a reverse polarity against the configuration of FIG. 15 as shown in the above described FIG. 6. The controlled DC power supply 60B in the case of FIG. 16 is configured to connect the switching element 62 and a free-wheeling diode 63 in the reverse polarity relative to FIG. 15, which is the same configuration as the controlled DC power supply 60B of FIG. 13.

In the configuration of FIG. 16, a rapid change of a voltage when turning off the switching element 62 is generated in the negative direction. Therefore, in order to prevent the switching element 62 from a breakdown due to a rapid change of the voltage, a snubber diode 105 may be connect in a polarity making the direction from the connection point A toward the negative electrode of the first DC voltage unit 20 as the reverse direction as shown in FIG. 16. This can be analogized based on the above description.

Note that both of the snubber diodes 105 and 105 that are shown in FIGS. 15 and 16, respectively, may be equipped. Such a configuration is beneficial when a bidirectional switch is used as switching element as in the case of the seventh embodiment shown in FIG. 14.

Next, FIG. 17 is a configuration diagram showing a ninth embodiment of the present invention, which is equivalent to the invention noted in claim 12.

The ninth embodiment is configured to add a snubber diode 105 to the configuration of FIG. 6, connecting it in a polarity of the direction from the connection point A between an AC motor 100 and a switching element 62 toward the negative pole of a first DC voltage unit 20 as reverse direction.

An operation and action effect of the present embodiment can be analogized based on FIGS. 6, 15 and 16, and therefore a description is omitted here.

Figure 18:
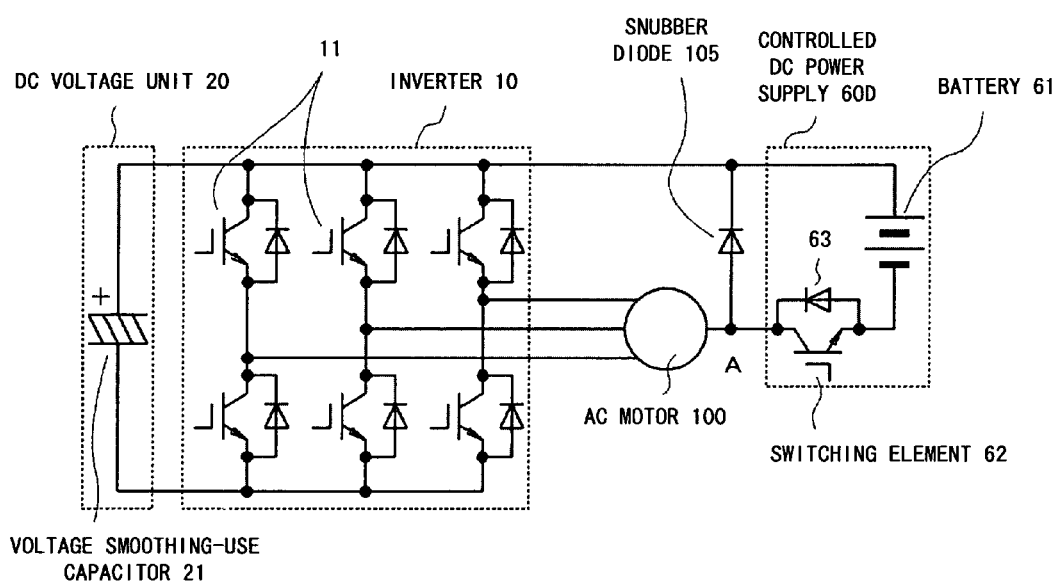
FIG. 18 is a configuration diagram showing a modified example of the ninth embodiment.

FIG. 18 is a configuration diagram showing a modified example of the ninth embodiment. The present modified example is configured to connect a snubber diode 105 in a polarity making the direction from the connection point A between an AC motor 100 and a switching element 62 toward the positive electrode of the first DC voltage unit 20 as forward direction, in addition to comprising a controlled DC power supply 60D that has reversed polarities of the switching element 62 and free-wheeling diode 63 which are comprised by the controlled DC power supply 60A (refer to FIG. 17).

Note that both of the snubber diodes 105 and 105 that are shown in FIGS. 17 and 18, respectively, may be comprised in consideration of a case of using a bidirectional switch as switching element as in the case of the eighth embodiment.

FIG. 19 is a configuration diagram showing a tenth embodiment of the present invention, which is equivalent to the invention noted in claim 13.

The above described individual embodiments are preferably to configure the constituent component, with the exception of at least the AC motor 100 and battery 61, as a single unit because the inverter (i.e., a power converter) 10 and switching element 62 need to be controlled by linking them together, and the first DC voltage unit 20 and inverter 10 are usually placed close to each other for the purpose of reducing a floating inductance.

Particularly when connecting a snubber diode 105 as in the configurations of FIGS. 16 through 18, a placement of the switching element 62, which is serially connected to the battery 61, apart from the first DC voltage unit 20 makes the length of a cable for connecting the snubber diode 105 becomes long, bringing about the problem of degrading a snubber characteristic due to the impedance of the cable as well as the problem of cost and workability. Therefore, it is preferable to place the switching element 62 close to the first DC voltage unit 20 also from the viewpoint.

The tenth embodiment shown by FIG. 19 is conceived on the basis of the above viewpoint, and configures a single unit 500 by accommodating the inverter 10, first DC voltage unit 20, switching element 62, diode 63 and snubber diode 105 in a single casing. Note that the unit 500 is equipped with a connection terminal B for connecting the AC motor 100.

Here, also incorporating the battery 61 into the single unit 500, or placing it nearby the unit 500, makes it possible to shorten the cable for connecting the snubber diode 105, thus improving the convenience.

Note that the AC motor 100 is connected to a power source and a mechanical load, making the conditions of temperature and vibration sometimes severe, and therefore it is conceivable to configure to place only the AC motor 100 separately for not levying such a severe condition to other constituent components.

The present invention is contrived to connect a controlled DC power supply constituted by a serial circuit of a semiconductor switching element and a second DC voltage unit such as a storage battery between an AC motor and a first DC voltage unit, thereby making it possible to control an average voltage and current applied to the second DC voltage unit by controlling a turning on and off of the semiconductor switching element within the controlled DC power supply and control a power of the second DC voltage unit.

This in turn enables a utilization of a capability of a power converter to its best and an improvement of a freedom of designing an electric power system without being constrained by a voltage of the second DC voltage unit.

What is claimed is:
1. An electric power system, comprising:
an AC motor including a coil;
a first DC voltage unit having a positive pole and a negative pole;

a power converter connected between the AC motor and first DC voltage unit, the power converter for exchanging power between the AC motor and the first DC voltage unit; and a controlled DC power supply having a first terminal and an output terminal, the output terminal directly connected to an arbitrary spot of the coil of the AC motor, and the first terminal directly connected to either the positive pole or to the negative pole of the first DC voltage unit, wherein the controlled DC power supply comprising at least one semiconductor switching element connected in series with a second DC voltage unit, the at least one semiconductor switching element including a first electrode and a second electrode, the second DC voltage unit including a third electrode and a fourth electrode, and wherein the first electrode of the at least one semiconductor switching element is directly connected to the output terminal and to the arbitrary spot of the coil of the AC motor, the second electrode of the at least one semiconductor switching element is directly connected to the third electrode of the second DC voltage unit, and the fourth electrode of the second DC voltage unit is directly connected to the first terminal of the controlled DC power supply.

2. The electric power system according to claim 1, connecting said controlled DC power supply between a neutral point of the coil of said AC motor and the positive or negative pole of the first DC voltage unit.

3. The electric power system according to claim 2, wherein an open voltage of the second DC voltage unit is one third or less of a voltage of a first DC voltage unit and also a diode of a polarity that discharges the second DC voltage unit is connected in parallel with said semiconductor switching element serially connected to the second DC voltage unit.

4. The electric power system according to claim 2, wherein an open voltage of a second DC voltage unit is lower than a voltage of the first DC voltage unit and also two thirds or more of the voltage thereof, and a diode of a polarity that charges the second DC voltage unit is connected in parallel with the semiconductor switching element serially connected to the second DC voltage unit.

5. The electric power system according to claim 2, wherein said semiconductor switching element serially connected to the second DC voltage unit constitutes a bidirectional switch capable of connecting or shutting off a current flow bi-directionally.

6. The electric power system according to claim 2, wherein the negative pole of the first DC voltage unit and that of the second DC voltage unit are mutually connected practically at the same DC potential, and further comprising;

either one of a diode connected in a direction starting from a connection point between said AC motor and semiconductor switching element toward the positive pole of the first DC voltage unit as a forward direction, or a diode connected in a direction starting from the connection point between the AC motor and semiconductor switching element toward the negative pole of the first DC voltage unit as a reverse direction.

7. The electric power system according to claim 2, wherein the positive pole of the first DC voltage unit and that of the second DC voltage unit are mutually connected practically at the same DC potential, and further comprising;

either one of a diode connected in a direction starting from a connection point between said AC motor and semiconductor switching element toward the positive pole of the first DC voltage unit as a forward direction, or a diode connected in a direction starting from the connection point between the AC motor and semiconductor switching element toward the negative pole of the first DC voltage unit as a reverse direction.

8. The electric power system according to claim 1, wherein the second DC voltage unit is a storage battery.

9. The electric power system according to claim 1, wherein the second DC voltage unit is a capacitor.

10. The electric power system according to claim 1, supplying a power supply for a control apparatus of said power converter from the second DC voltage unit.

11. The electric power system according to claim 10, equipping a mechanical power unit for providing said AC motor with an axial torque.

12. The electric power system according to claim 11, supplying a power source for electrical components and electrical equipment required for said mechanical power unit from the second DC voltage unit.

13. The electric power system according to claim 1, constituting at least the first DC voltage unit, said power converter and semiconductor switching element as a single unit.

14. An electric power system, comprising:

an AC motor including a coil;

a first DC voltage unit having a positive electrode and a negative electrode;

a power converter connected between the AC motor and the first DC voltage unit, the power converter for exchanging power between the AC motor and the first DC voltage unit; and a controlled DC power supply which is connected between an arbitrary spot of the coil of the AC motor and the positive or negative electrode of the first DC voltage unit and which connects at least one semiconductor switching element connected to the arbitrary spot of the coil and a second DC voltage unit connected to the positive or the negative electrode in series;

connecting said controlled DC power supply between a neutral point of the coil of said AC motor and the positive or negative electrode of the first DC voltage unit;

wherein a negative electrode of the first DC voltage unit and that of the second DC voltage unit are mutually connected practically at the same DC potential, and further comprising;

either one of a diode connected in a direction starting from a connection point between said AC motor and semiconductor switching element toward a positive electrode of the first DC voltage unit as a forward direction, or a diode connected in a direction starting from the connection point between the AC motor and semiconductor switching element toward a negative electrode of the first DC voltage unit as a reverse direction.

15. An electric power system, comprising:

an AC motor including a coil;

a first DC voltage unit having a positive electrode and a negative electrode;

a power converter connected between the AC motor and the first DC voltage unit, the power converter for exchanging power between the AC motor and the first DC voltage unit; and a controlled DC power supply which is connected between an arbitrary spot of the coil of the AC motor and the positive or negative electrode of the first DC voltage unit and which connects at least one semiconductor switching element connected to the arbitrary spot of the coil and a second DC voltage unit connected to the positive or the negative electrode in series;

connecting said controlled DC power supply between a neutral point of the coil of said AC motor and the positive or negative electrode of the first DC voltage unit; and a positive electrode of the first DC voltage unit and that of the second DC voltage unit are mutually connected practically at the same DC potential, and further comprising;

either one of a diode connected in a direction starting from a connection point between said AC motor and semiconductor switching element toward a positive electrode of the first DC voltage unit as a forward direction, or a diode connected in a direction starting from the connection point between the AC motor and semiconductor switching element toward a negative electrode of the first DC voltage unit as a reverse direction.

* * * * *